May 6, 1947.  G. C. FIELDS  2,420,071
TURBINE TYPE HYDRAULIC COUPLING
Filed Jan. 11, 1945  2 Sheets-Sheet 1

INVENTOR
GEORGE C. FIELDS
BY
ATTORNEY

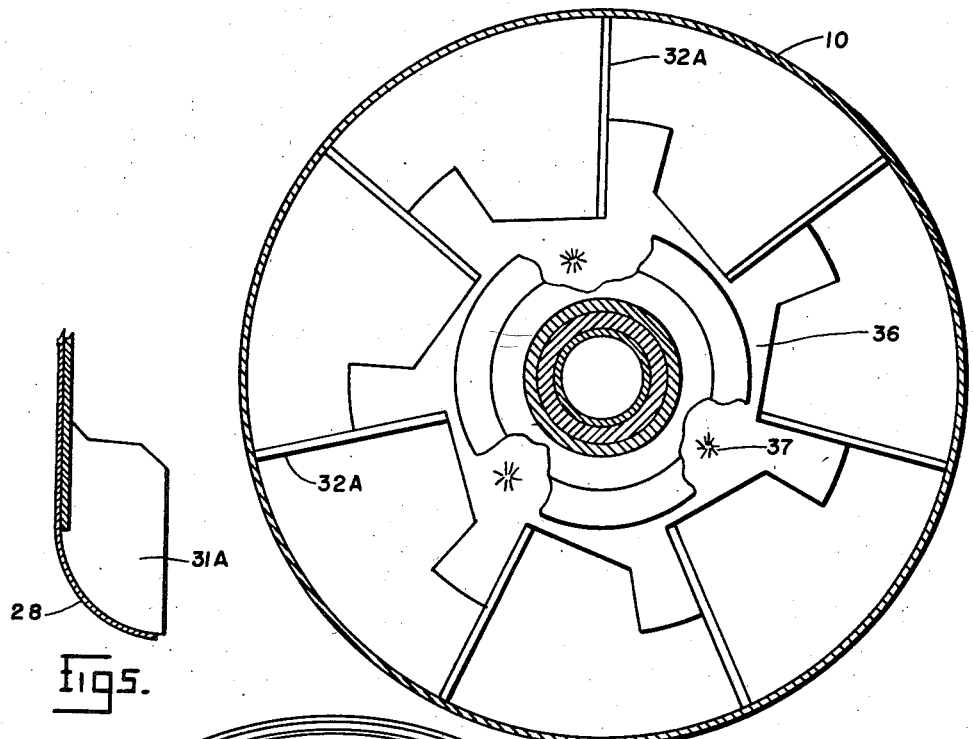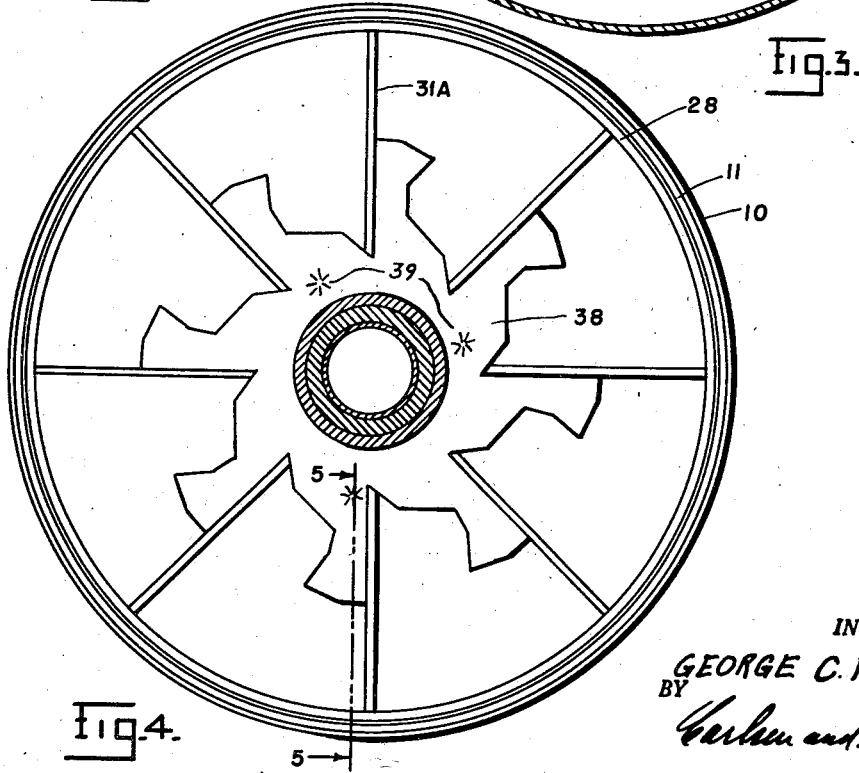

Patented May 6, 1947

2,420,071

UNITED STATES PATENT OFFICE 2,420,071

TURBINE TYPE HYDRAULIC COUPLING

George C. Fields, Wilmette, Ill., assignor to Solar corporation, Milwaukee, Wis., a corporation of Delaware Application January 11, 1945, Serial No. 572,338

5 Claims. (Cl. 60—54)

1

This invention relates to fluid drive couplings of the so-called Föttinger or turbine type, and the main object is to provide an extremely simple, practical and efficient hydraulic drive unit for transmitting power from a driving member to a driven member. A further object is to provide a hydraulic coupling that is especially economical in manufacture and which is virtually "foolproof" in operation, whereby it particularly adapts itself to use in motor scooters, power mowers, and as power transmitters for small utility motors for other purposes where high priced transmission units are impractical and where the equipment may not always receive expert mechanical or maintenance attention.

Still further and more specific objects will be disclosed in the course of the following specification, reference being had to the accompanying drawings, wherein:

Fig. 3 is an internal section elevation as on line 3—3 in Fig. 1, but showing a modified construction of the driven impeller.

Fig. 4 is a sectional elevation, as on line 4—4 in Fig. 1, but illustrating a modified form of the driving impeller.

Fig. 5 is a detail section on line 5—5 in Fig. 4.

Figure 1:
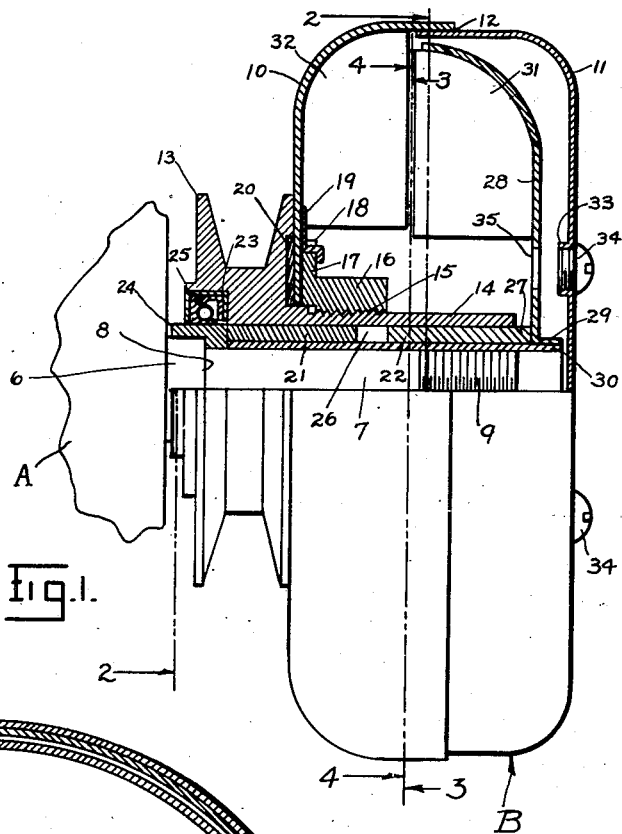
Fig. 1 is an elevation of my improved fluid drive coupling, showing it as mounted on a motor shaft, and with the upper half in vertical diametrical section to illustrate the internal construction.
Figure 2:
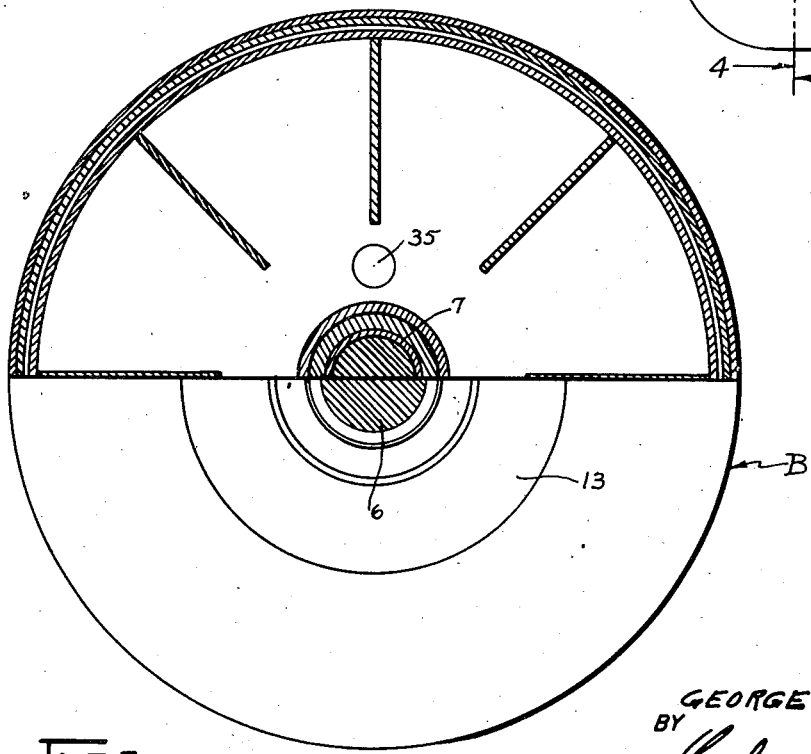
Fig. 2 is a plan elevation of the drive unit, partly in section, as on line 2—2 in Fig. 1.

Referring to the drawings more particularly and by reference characters A designates an engine or motor from which projects a power shaft 6. This shaft has a reduced end portion 7 that terminates at a shoulder 8, and an end part of the portion 7 is threaded as at 9. The fluid coupling, designated generally as B, includes a housing made up of two half sections or shells 10 and 11. These shells peripherally overlap at 12 where they may be sweated, welded or otherwise permanently fastened and sealed together, as there will be little or no occasion for separating them after the unit has once been assembled and ready for use. The shell 11 is of course supported by and mounted for rotation with the section 10.

The casing section 10 is supported against the outer surface of a V-belt pulley 13, the latter having an elongated hub sleeve 14 which projects into the fluid coupling axially about the shaft portion 7, and the part of the sleeve 14 adjacent the pulley is threaded, as at 15, to receive a nut 16. This nut is preferably provided with a flange

2

17, and this flange has one or more notches 18, engaged by tabs or lugs 19, spot welded to the inner face of cup section 10, to temporarily hold the nut in place and prevent it from turning, with respect to the casing, during the assembling operation and until the nut is turned home on the sleeve 14. When the nut is screwed up tight it will obviously clamp the shell 10 tightly and rigidly between itself and the pulley, and to prevent any possibility of leakage at this point I preferably recess the face of the pulley and insert a sealing gasket 20.

Within the sleeve 14 there is rigidly mounted, as by press fitting, a pair of bushings 21 and 22, the first of which extends flush with an annular recess 23 in the motor side face of the pulley, at which point it contacts a collar 24 that is L-shaped in cross section (Fig. 1) and bears against the shoulder 8 of the shaft 6. The outer periphery of the collar 24 is smooth surfaced to engage a sealing ring 25 mounted in the recess 23.

A space 26 is preferably left between the bushings 21 and 22, if two bushings are used, although, as will be evident, it may be desirable to use only one bushing with a length equal to the two shown. In either event the bushing 22 projects beyond the inner extremity of the sleeve 14, as at 27, to form a stop for an impeller shell 28 which is housed within the section 11 and opposes the shell section 10 with respect to which it is rotatable.

The impeller shell 28 has a flange 29 which is welded or otherwise rigidly secured upon the end of a tube or sleeve 30 which extends in to abutting contact with the collar 24. This sleeve 30 has a section of its interior threaded so as to screw onto the threads 9 of the shaft section 7, and when the sleeve is tightly screwed into place it will not only clamp the collar 24 tightly to the shaft but will properly mount the entire assembly on the shaft. The threads 9 and 15 are preferably cut in a direction such that rotation of the driving parts will tend to tighten rather than release or unscrew any of the assembly elements.

The impeller 28 is provided with the usual impeller blades or vanes 31 the curved edges of which contact and are welded to the impeller plate, with opposite or inner edges free or exposed. Similarly, the driven shell section 10 is provided with blades or vanes 32, which are welded or otherwise rigidly secured to the inner surfaces, and in opposed cooperating position with blades 31, there being a narrow margin of clearance between the adjacent parallel edges of the blades of the two sections.

The outer face plate of the shell section 11 is provided with two threaded holes 33 in which are secured short screws 34, and the impeller shell 28 is provided with two holes 35 adapted to be aligned with the holes 34. The normally closed holes 33 serve two purposes. Thus, they are used to fill and drain the oil or other liquid that is used as the rotation imparting medium between the two impeller units 28 and 10.

The holes 33 are also employed in attaching and detaching the coupling assembly with respect to the motor shaft as will now be set forth.

With the parts all properly formed the sleeve 14 of the pulley 13 is inserted through the central opening of the shell 10 to which the nut 16 has previously been positioned and held by the lugs 19. The impeller 28 including the sleeve 30 is then put in place with the sleeve being positioned into the bushings 21 and 22. The outer shell or section 11 is then properly located with respect to the section 10 and is there sweated, spot welded, or otherwise rigidly secured at the seam 12 and about the entire periphery of the unit. After the collar 24 has then been placed upon the shaft 7 and up against the shoulder 8 and the sealing ring 25 is properly inserted in the annular recess 23 of the pulley, the entire assembly is then placed upon the reduced end portion 7 of the shaft and the sleeve 30 is screwed up tightly on the threads 9 and against the collar 24. The sleeve 30 is rotated by removing the short screws 34 and temporarily replacing them with longer screws that will extend into the holes 35 of the impeller plate 28. By using longer screws in this manner the two plates 11 and 28 are not only rigidly secured together but will prevent any damage to the threads in the holes 33, such as would occur if threadless pins or objects were inserted in the registering holes 33 and 35. With the plates 28 and 11 locked together it will be apparent that the sleeve 30 may be rotated merely by rotating the casing 10—11, and as previously noted, the threads 9 should be cut in a direction opposite to the driving direction of the motor shaft 6 so that the rotation of the motor will not tend to unscrew the shaft from the coupling.

When the unit is properly secured on the shaft the long screws are removed from the holes 33, thus freeing the impeller 28 for rotation with respect to the casing 10—11, and a predetermined amount of fluid is then inserted in one of the holes 33 after which both of these holes are sealed closed by the use of shorter screws 34. When the coupling is idle the driving fluid will rest in the bottom of the casing and will of course find its level within the curved periphery extremities of the casing, as well as the impeller 31. When the motor is then started it will rotate the tube or sleeve 30 with the shaft 6 and such rotation will carry with it the impeller plate 28 and its radial blades 31. As previously noted, the sleeve 30 is free to rotate within the bushings 21 and 22 as such bushings have an internal diameter that will permit such rotation but since the bushings are tightly fitted in the pulley 13 and its extended hub 14 those parts will rotate in unison and together with the nut 16 and the driven blades 32 of the section 10. As the impeller 28 is thus rotated by the motor shaft its blades 31 will pick up the fluid in the bottom of the casing and centrifugally actuate it radially outwardly where it will be deflected into circulating engagement with the blades 32 to impart rotational movement to the casing. As the casing revolves it will in turn rotate the pulley 13 and thus flexibly transmit rotational power to any device which is belt connected to the pulley.

Should there be any occasion for replacing or repairing the bushings 21 and 22 or the pulley proper, it is a simple matter to first remove the unit from the motor shaft by an operation reverse to that just described and thereupon the parts 13, 14, 21 and 22 may be removed by merely unscrewing the pulley and its tubular hub from the nut 16. After the proper repair or replacement has taken place, it is a simple matter to again assemble the parts by merely slipping the sleeve 14 and its bushings over the tube 30 and then turning it inwardly within the threads 15 until the pulley again tightly fits up against the outer face of the casing section 10.

In the modification shown in Figs. 3, 4, and 5 I have illustrated a design in which it is unnecessary to individually and separately fasten the edges of the impeller blades to their respective shell members.

Thus in Fig. 3 it will be seen that the blades 32a of the driven section are punched out and bent up from a separate plate 36 and this plate is then merely spot-welded as at 37 to the shell section 10. Similarly, as in Figs. 4 and 5, the blades 31a are formed integrally with and from a plate 38 which is spot welded, as at 39, to the impeller plate 28. Although this method of mounting the blades requires slightly more material than where individually mounted blades are used, it is believed that there will be relatively greater economy in time, labor, and ultimate cost involved in manufacturing the complete unit.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A fluid drive device adapted to be mounted on a motor shaft or the like, comprising a fluid retaining casing, a power transmitting element disposed on the motor side of the casing and having a tubular hub extending into the casing to support the latter, a bearing sleeve within the hub, an impeller mounted upon the end of the sleeve remote from the motor, and blades carried within the casing, at the motor side thereof, for cooperation with the impeller to thereby translate sleeve and impeller rotation to the casing, hub and power transmitting element, said tubular hub being threaded and having a nut thereon for engaging the inner surface of the motor side of the casing to rigidly clamp it against the power transmitting element.

2. A fluid drive device comprising a circular fluid retaining casing having internal fluid actuable blades, a power transmitting member at one side of the casing and having a tubular hub extending into the casing, threaded means on the hub for rigidly securing the casing with respect to the power transmitting member, a bushing secured in the hub, a sleeve slidable and rotatable in the bushing, and an impeller mounted on the sleeve.

3. A fluid drive device comprising circular fluid retaining casing having internal fluid actuable blades, a power transmitting member at one side of the casing and having a tubular hub extending into the casing, threaded means on the hub for rigidly securing the casing with respect to the power transmitting member, a bushing secured in the hub, a sleeve slidable and rotatable in the bushing, and an impeller mounted on the sleeve, said sleeve being internally threaded whereby it may be screwed onto a threaded power shaft.

4. A fluid drive device comprising a circular fluid retaining casing having internal fluid actuable blades, a power transmitting member at one side of the casing and having a tubular hub extending into the casing, threaded means on the hub for rigidly securing the casing with respect to the power transmitting member, a bushing secured in the hub, a sleeve slidable and rotatable in the bushing, and an impeller mounted on the sleeve, said sleeve being internally threaded whereby it may be screwed onto a threaded power shaft, the parts being so constructed that when the sleeve is removed from the power shaft the power transmitting means may be turned with respect to the casing to unscrew the hub from said threaded means to remove the hub and bushing from the casing and sleeve.

5. A fluid drive device comprising a circular fluid retaining casing having internal fluid actuable blades, a power transmitting member at one side of the casing and having a tubular hub extending into the casing, threaded means on the hub for rigidly securing the casing with respect to the power transmitting member, a bushing secured in the hub, a sleeve slidable and rotatable in the bushing, means for preventing rotation of the threaded means with respect to the casing during assemblage, and a bladed impeller mounted on the sleeve.

GEORGE C. FIELDS.

REFERENCES CITED

The following references are of record in the file of this patent:

UNITED STATES PATENTS

| Number | Name | Date |
|---|---|---|
| 1,047,948 | Karminski et al. | Dec. 24, 1912 |
| 1,535,474 | Jacobsen | Apr. 28, 1925 |
| 1,972,741 | Kohl | Sept. 4, 1934 |
| 2,117,011 | Pratt | May 10, 1938 |
| 2,216,747 | Klimek | Oct. 8, 1940 |
| 2,294,994 | Maze | Sept. 8, 1942 |
| 2,318,187 | Addison | May 4, 1943 |
| 2,340,494 | Smirl | Feb. 1, 1944 |

FOREIGN PATENTS

| Number | Country | Date |
|---|---|---|
| 687,919 | German | 1940 |